(12) United States Patent
Swift et al.

(10) Patent No.: US 8,304,120 B2
(45) Date of Patent: *Nov. 6, 2012

(54) SCALABLE MICROBIAL FUEL CELL AND METHOD OF MANUFACTURE

(75) Inventors: Joseph A Swift, Ontario, NY (US); Roger Bullock, Webster, NY (US); Stanley J Wallace, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 736 days.

This patent is subject to a terminal disclaimer.

(21) Appl. No.: 12/468,108

(22) Filed: May 19, 2009

(65) Prior Publication Data

US 2009/0324998 A1 Dec. 31, 2009

Related U.S. Application Data

(63) Continuation-in-part of application No. 12/164,186, filed on Jun. 30, 2008, now Pat. No. 7,807,303.

(51) Int. Cl.
*H01M 8/16* (2006.01)
(52) U.S. Cl. .................. 429/401; 429/2
(58) Field of Classification Search .......... 429/2, 401
See application file for complete search history.

(56) References Cited

U.S. PATENT DOCUMENTS

| | | | |
|---|---|---|---|
| 6,240,732 B1 | 6/2001 | Allan | 60/739 |
| 6,294,281 B1 | 9/2001 | Heller | 429/43 |
| 6,497,975 B2 | 12/2002 | Bostaph et al. | 429/38 |
| 6,500,571 B2 | 12/2002 | Liberatore et al. | 429/2 |
| 6,531,239 B2 | 3/2003 | Heller | 429/43 |
| 7,052,763 B2 | 5/2006 | Swift et al. | 428/300.4 |
| 7,160,637 B2 | 1/2007 | Chiao et al. | 429/2 |
| 2005/0031840 A1 | 2/2005 | Swift et al. | 428/292.1 |
| 2006/0019129 A1 | 1/2006 | Liu et al. | 429/12 |
| 2006/0147763 A1* | 7/2006 | Angenent et al. | 429/2 |
| 2007/0134520 A1 | 6/2007 | Shimomura et al. | 429/2 |
| 2007/0259217 A1* | 11/2007 | Logan | 429/2 |
| 2008/0280184 A1 | 11/2008 | Sakai et al. | 429/34 |

(Continued)

FOREIGN PATENT DOCUMENTS

WO    WO 03/106966 A2    12/2003

OTHER PUBLICATIONS

Article Re: "Application of Bacterial Biocathodes in Microbial Fuel Cells" by Zhen He, Largus T. Angenent, Electroanalysis 18, 2006, No. 19-20, pp. 2009-2015, Copyright 2006 Wiley-VCH Verlag GmbH & Co. KGaA, Weinheim.

(Continued)

*Primary Examiner* — Patrick Ryan
*Assistant Examiner* — Alex Usyatinsky
(74) *Attorney, Agent, or Firm* — Alix, Yale & Ristas, LLP

(57) ABSTRACT

A microbial fuel cell includes a cell housing having first and second chambers. The first chamber is adapted for containing a fluid including a biomas. The second chamber is adapted for containing an oxygenated fluid. A cathode extends into the cell housing second chamber. An electrode assembly includes a bound segment and an anode segment extending into the cell housing first chamber. The electrode assembly has multiple, substantially aligned, fibers. The outer surfaces of the fibers of the anode segment are adapted for receiving a biofilm. An electrically conductive tubular member envelops the fibers of the bound segment.

15 Claims, 3 Drawing Sheets

U.S. PATENT DOCUMENTS

2008/0286624 A1* 11/2008 Lovley et al. .................. 429/27

OTHER PUBLICATIONS

Article Re: "An Upflow Microbial Fuel Cell with an Interior Cathode: Assessment of the Internal Resistance by Impedance Spectroscopy" by Zhen He, Norbert Wagner, Shelley D. Minteer, and Largus T. Angenent, Environmental Science & Technology/vol. 40, No. 17, 2006, pp. 5212-5217, Copyright 2006 American Chemical Society, Published on Web Jun. 29, 2006.

Article Re: "Utilizing the green alga Chlamydomonas reinhardtii for microbial electricity generation: a living solar cell" (Biotechnological Products and Process Engineering), by Miriam Rosenbaum, Uwe Schroder and Fritz Scholz, Institut fur Chemie und Biochemie, Universitat Greifswald, Soldmannstrasse 16, Greifswald, 17489, Germany, Published online Feb. 5, 2005, pp. 753-756.

Article Re: "Heat treated soil as convenient and versatile source of bacterial communities for microbial electricity generation" by Juliane Niessen, Falk Harnisch, Miriam Rosenbaun, Uwe Schroder, and Fritz Scholz, Institute of Chemistry and Biochemistry,Univeristy of Greifswald, Soldmannstrasse 16, 17489 Greifswald, Germany, Copyright 2006, Elsevier B.V., www.sciencedirect.com, pp. 869-873.

Article Re: "Increased power production from a sediment microbial fuel cell with a rotating cathode" by Zhen He, Haibo Shao, and Largus T. Angenent, Copyright 2007 Elsevier B.V., Science Direct, Biosensors and Bioelectronics 22 (2007), www.sciencedirect.com, pp. 3252-3255.

Article Re: "Characterization of a filamentous biofilm community established in a cellulose-fed microbial fuel cell" by Shun'ichi Ishii, Takefumi Shimoyama, Yasuaki Hotta and Kazuya Watanabe, BMC Microbiology, Biomed Central, London, Great Britain; vol. 8, Pub. Date Jan. 2008, pp. 1-12.

Article Re :"Graphite Fiber Brush Anodes for Increased Power Production in Air-Cathode Microbial Fuel Cells" by Bruce Logan, Shaoan Cheng, Valerie Watson, and Garett Estadt, Dept. of Civil and Environmental Engineering, The Penn State Hydrogen Energy (H2F) Center, and Department of Chemical Engineering, Penn State University, University Park, Pennsylvania 16802, Environmental Science & Technology. 2007, vol. 41, No. 9, pp. 3341-3346, Copyright 2007 American Chemical Society, Published on Web Mar. 21, 2007.

Article Re: "Power Generation and Electrochemical Analysis of Biocathode Mocrobial Fuel Cell Using Graphite Fibre Brush as Cathode Material" by S.-J. You, N.-Q. Ren, Q.-L. Zhao, J.-Y. Wang, and F.-L. Yang, Fuel Cells Sep. 2009, No. 5, pp. 588-596, Copyright 2009 Wiley-VCH Verlag GmbH & Co. KGaA, Weinheim, Germany; www.fuelcells.wiley-vch.de.

* cited by examiner

SCALABLE MICROBIAL FUEL CELL AND METHOD OF MANUFACTURE

CROSS-REFERENCE TO RELATED APPLICATIONS

This application is a continuation-in-part of copending U.S. patent application Ser. No. 12/164,186 filed Jun. 30, 2008.

BACKGROUND

This disclosure relates generally to fuel cells and methods of their manufacture and use. More particularly, the present disclosure relates to fuel cells capable of operation by electrolyzing compounds in a biological system and methods of their manufacture and use.

There has long been interest in techniques for providing electrical power from a power source or for producing hydrogen from a liquid or solid source that utilizes biological matter freely available in the environment. One such area of interest is in developing microbial fuel cells (MFCs) as a means to treat wastewater more efficiently by breaking down organic waste products and converting the energy of their chemical bonds into electricity and hydrogen. According to the May 2004 issue of Environmental Science & Technology, 46 trillion liters of household wastewater are treated annually in the United States at a cost of $25 billion. Importantly, the electricity required—mostly for aeration—constitutes 1.5 to 2% of the electricity used in the nation. Other nations have similar statistics.

Recently, researchers have shown the feasibility of using microbial fuel cells to generate electricity wherein the source of electricity is the chemical energy contained in the bonds of organic compounds which are a principle constituent of wastewater. Using laboratory scale microbial fuel cell reactors comprising a special anode, a simple cathode and a suitable proton exchange membrane (PEM) to separate the wet anode and cathode portions of the microbial fuel cell, energy densities in the order of 30 watts/cubic meter have been generated. Expectations are that power densities will increase as the efficiency of the cells can be improved by advances such as those provided by the present fuel cell.

The process uses bacteria, living in biofilms on the special anode, to break down the organics contained in a biostream, separating electrons from protons. These electrons and protons then travel to the cathode, the former via an external wire, the latter by diffusing through the electrolyte which is generally a substance that permits effective movement of small molecules and atoms while at the same time the electrolyte does not effectively conduct electricity. In the electricity-generating microbial fuel cells, the protons and electrons combine at the cathode with oxygen to form water. This consumption of the electrons allows more electrons to keep flowing from the anode to the cathode as long as there is a source of chemical bonds (i.e. organic waste) to fuel the reaction.

The early microbial fuel cells produced between 1 and 40 milliwatts of power per square meter ($mW/m^2$) of anode electrode surface area. In the past few years researchers have been able to increase this more than 10 fold by demonstrating that they could generate power in the range of up to 500 $mW/m^2$ using domestic wastewater and 1,500 $mW/M^2$ with a surrogate for waste water comprising glucose and air. However, improvements to the output power density by another factor of at least 10 will be required in order to make the technology attractive on a commercial scale.

SUMMARY

There is provided a scalable microbial fuel cell having a cell housing defining first and second chambers. The first chamber is adapted to contain a fluid including a biomass. The second chamber is adapted to contain an oxygenated fluid. A cathode extends into the cell housing second chamber. At least one electrode assembly extends into the cell housing first chamber. Each electrode assembly has multiple substantially aligned electrically conductive fibers. The electrode assembly includes an anode segment, that extends from a first end of the fibers to an intermediate region disposed between the first and second ends of the fibers, and a bound segment, that extends from the second end of the fibers to the intermediate region. At least a portion of the outer surfaces of the unbound fibers of the anode segment are adapted to receive a biofilm. The outer surfaces of the fibers of the bound segment are impregnated or encased with a binder. An electrically conductive, generally tubular-shaped member envelops the fibers of the bound segment.

The fibers may be carbon fibers or carbon nanotubular filaments.

The electrode assembly may include a porous membrane that encloses the anode segment.

The anode segment may have a mechanical structure shape, such as a 2 or 3 dimensional woven or knitted structure or combination thereof.

The binder may be any suitable polymer, including thermosetting pre-polymers based on diglycidyl ether of bisphenol F, such as EPON 826, EPON 862, and EPON 828 or a modified acrylic resin (MODAR).

The tubular member may comprise substantially the same materials as the fibers and the binder.

The bound segment may also include a conductive adhesive, such as carbon nanotubes or carbon particle filled EPON™ 826 epoxy, disposed intermediate the fibers and the inner surface of the tubular member.

The tubular member may include a structure, such as a threaded post, a threaded hole, a stake-on, or a metalized spade, adapted to provide a low loss electrical interconnection with a conventional external circuit.

The length of the anode segment is generally 10 to 100 times or more the length of the bound segment.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

With reference to the drawings wherein like numerals represent like parts throughout the several figures, a scalable microbial fuel cell in accordance with the present disclosure is generally designated by the numeral 10. As used herein, the term "fiber" refers to non-metallic, fibers which exhibit a desired level of electrical conductivity. The term "binder", "binder resin", or "resin" as used herein refers to a matrix material that retains the fibers in place and may provide for one or more mechanical or structural features. The term "biomass" as used herein refers to any organic matter from which electrons and protons may be separated when the organic matter is suspended or dissolved in a fluid. The term "biofilm" as used herein refers to any agent or catalyst that can separate electrons and protons from a biomass.

Figure 1:
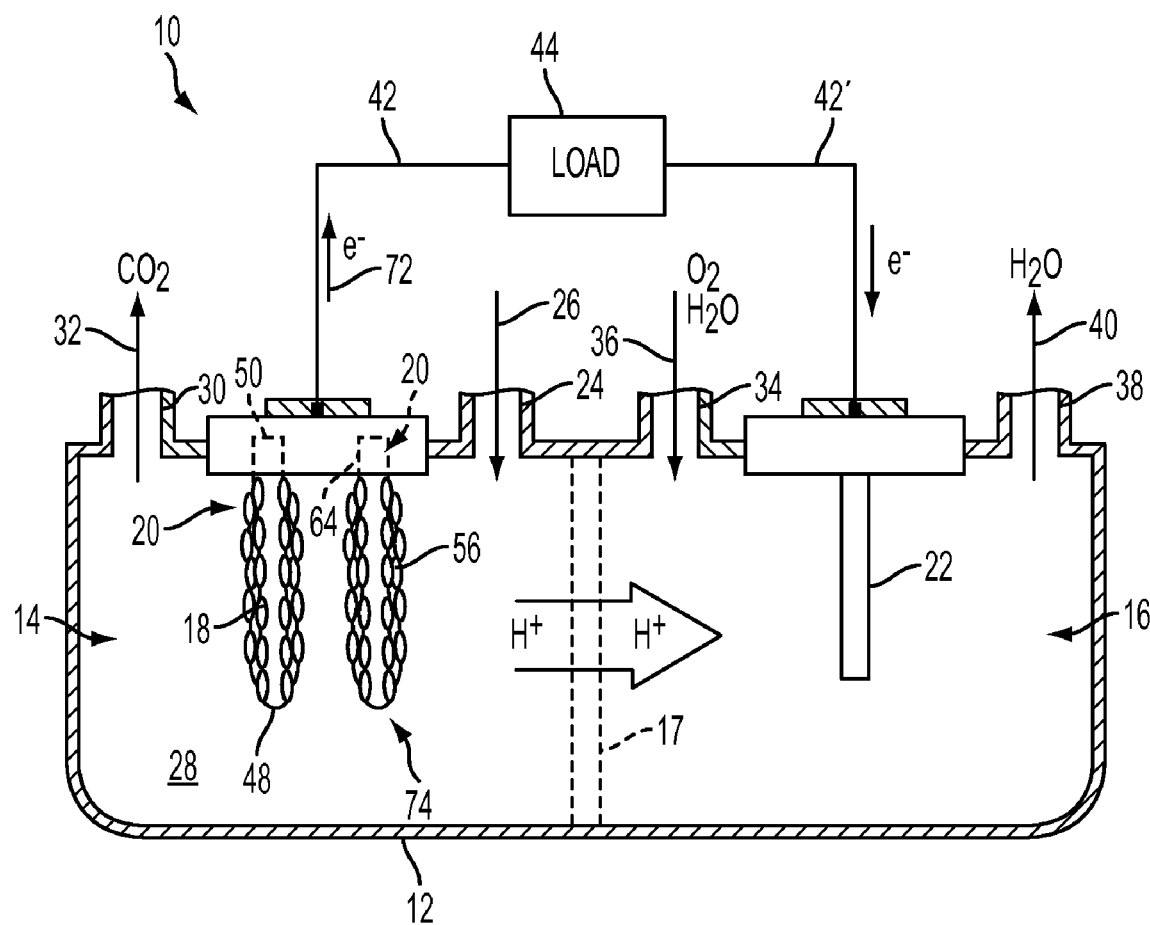
FIG. 1 is schematic diagram of a microbial fuel cell in accordance with the disclosure.

FIG. 1 is schematic diagram of a first embodiment of a microbial fuel cell 10 in accordance with the disclosure. The cell housing 12 is divided into first and second chambers 14, 16 by a protein exchange membrane 17. The active anode segment 18 of one or more anode assemblies 20 extend into the interior of the first chamber 14 and the cathode 22 extends into the interior of the second chamber 16. The first chamber inlet 24 is connected to a suitable source, for example a wastewater source (not shown) for receiving a wastewater flow stream 26 containing waste biomass 28. The first chamber outlet 30 discharges the treated wastewater 32 from the first chamber 14. The second chamber inlet 34 is connected to freshwater source for receiving an oxygenated freshwater flow stream 36. The second chamber outlet 38 discharges the oxygen depleted freshwater 40 from the second chamber 16. It should be appreciated that the discharged freshwater 40 may be oxygenated and recycled to the second chamber inlet 34. The protein exchange membrane 17 separating the first and second chambers 14, 16 prevents the relatively large oxygen molecules present in the second chamber 16 from diffusing into the first chamber 14, while allowing passage of proteins and hydrogen molecules. It also keeps solids that may be present in the wastewater stream 26 within the first chamber 14 of the cell 10. Electrical conductors 42, 42' extending from the anode assembly 20 and cathode 22 are connected to a load 44, completing an electrical circuit as described below. One or more loads 44 powered by the microbial fuel cell may include the pumps providing the flow of wastewater and freshwater, for example.

Figure 2:
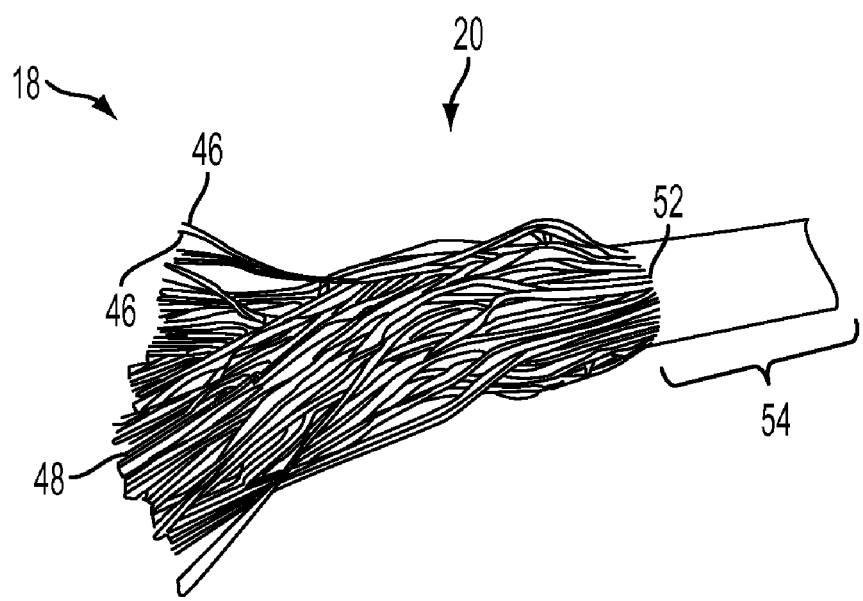
FIG. 2 is an enlarged perspective view of a first embodiment of the electrode assembly of the microbial fuel cell of FIG. 1.
Figure 3:
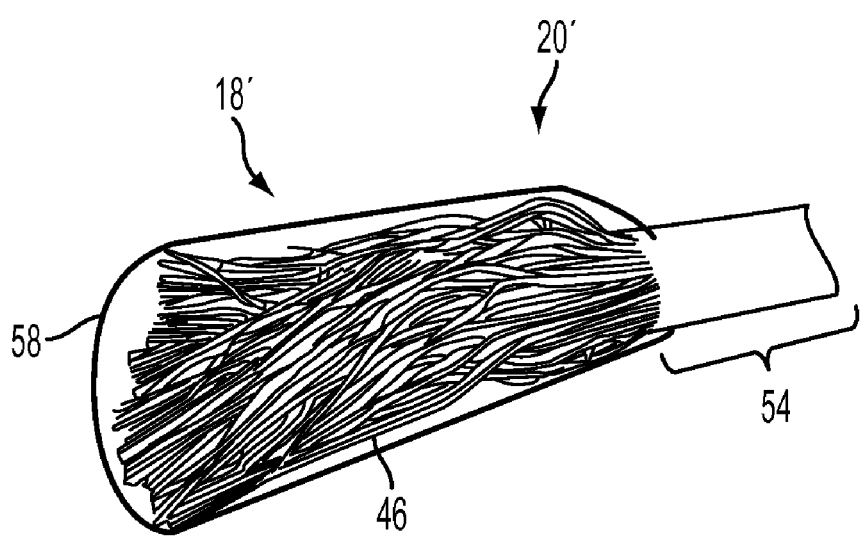
FIG. 3 is an enlarged perspective view of a second embodiment of the electrode assembly of the microbial fuel cell of FIG. 1.

Referring to FIGS. 2 and 3, the rod-shaped or plate-shaped anode assembly 20 enables full scalability of the microbial fuel cell 10 and comprises multiple substantially aligned fibers 46 extending from a first end 48 to a second end 50. A first, unbound/active anode segment 18 extends from the first end 48 to a second intermediate region 52 disposed between the first and second ends 48, 50, and a third, bound segment 54 extends from the intermediate region 52 to the second end 50. The fibers 46 are composed of a conductive material such as carbon fibers or carbon nanotubular filaments. For example, unsized carbon fiber tow which includes continuous lengths of numerous individual fibers, such as 80,000 CFT sold by MTLS, Alpharetta, Ga. can be used for the fibers 46.

In the unbound/active anode segment 18, the fibers 46 are configured into a high surface area, parallel array that are substantially unbound and extend freely from the bound segment 54. As used herein, "unbound" fibers are fibers 46 that are not impregnated or encased by a binder, whereby the outer surface of each unbound fiber may be coated by a biofilm 56 along the unbound length of fiber 46.

Figure 5:
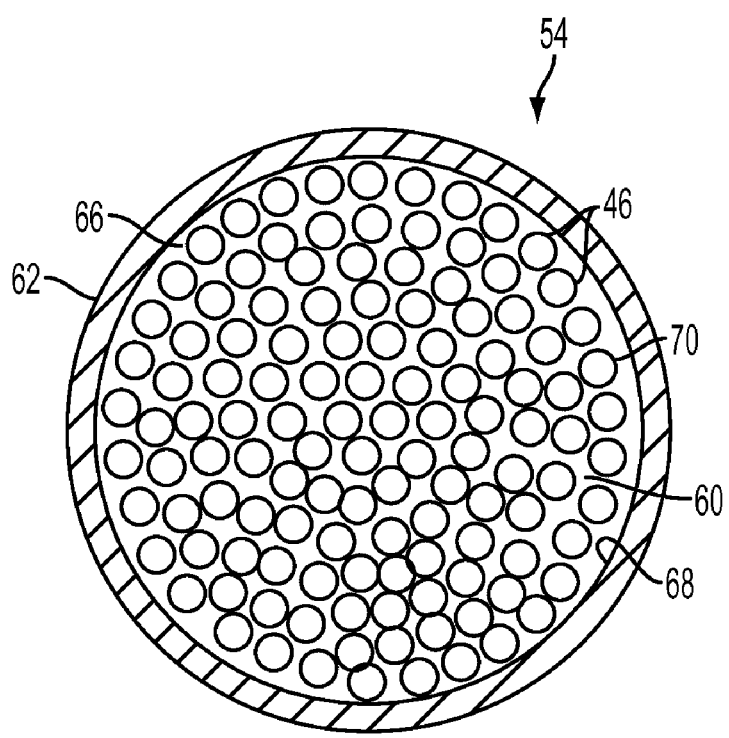
FIG. 5 is a cross-sectional view taken along line 5-5 of FIG. 4.

In the bound segment 54 (FIGS. 1 and 5), the outer surfaces of the fibers 46 may be impregnated or encased with a suitable binder resin 60 such as EPON 826, EPON 862, EPON 828 and the like, which are thermosetting pre-polymers based on diglycidyl ether of bisphenol F. An electrically conductive, composite plastic tubular member 62 may envelope the fibers 46 of the bound segment 54. For example, the tubular member 62 may be a 6 mm OD×4 mm ID round tubular pultrusion to bind one end into a high performance, multi functional fluid seal and electromechanical interconnect.

The tubular member 62 may comprise the same or similar conductive fibers as the anode and a suitable, similar binder resin such as EPON 826. Alternatively, the tubular member 62 may be any suitable metal or metal alloy.

The tubular member 62 effectively defines the shape and size of the bound segment 54 of the anode assembly 20 and can be any suitable size and/or shape. For example round, circular, square or rectangular shaped tubes or U-shaped or V-shaped, or other channel-shaped configurations may be used. The outer surface of the tubular member 62 can be integrated appropriately with a seal device 64 to create a suitable seal and to enable easy removal and replacement which may be required in order to service the cell 10. The tubular member 62 may include a structure such as a threaded post, stake-on, metalized spade, or other appropriate configuration that provides a low loss electrical interconnection with a conventional external circuit. A suitably conductive adhesive 66, such as carbon nanotube filled or carbon particle filled EPON™ 826 epoxy, for example EP6NMW2.0R or EP2NMW2.0R sold by Zyvex Performance Materials, Columbus Ohio, can be used to provide the fluid seal and electromechanical interconnection between fibers 46 and the inner surface 68 of the tubular member 62.

The large surface areas of the unbound fibers 46 in the unbound/active anode segment 18 become coated with a biofilm 56 during operation of the microbial fuel cell 10, the microbes interacting with and bonding to the surface 70 of the fibers. A chemical reaction between electrochemically active bacteria in the biofilm 56 and biomass 28 in the wastewater stream 26 reduces the biomass 28, and in so doing produces electrons 72 that are transferred to the anode segment 18 and then out to the external circuit. Among the electrochemically active bacteria are, Shewanella putrefaciens, Aeromonas hydrophila, and others. Some bacteria, which have pili on their external membrane, are able to transfer their electron production via these pili. The large population of microbes when immersed in a carbohydrate containing solution, such as industrial or communal waste water serves to oxidize the carbohydrates contained within the waste water stream and transfer electrons 72 produced by the chemical reaction to the fibers 46, which in turn conduct the electron(s) 72 to and through the bound segment 54 to a conventional external circuit.

The length of the unbound fibers 46 extending from the bound segment 54 is relatively long for example, generally 10 to 100 times, or more, the length of the bound fibers thereby providing a large surface area anode to deliver high output energy densities. Since the fibers 46 directly interconnect all reaction sites to the external circuit, no loss of power due to high resistance interconnections can occur. This design enables scalability of the anode area by simply addition of an appropriate number of the anode assemblies 20 to the microbial fuel cell 10. Any appropriate number of anode assemblies 20 can be combined to form an anode array 74 with a proportionately larger anode area to produce higher levels of output power.

Figure 4:
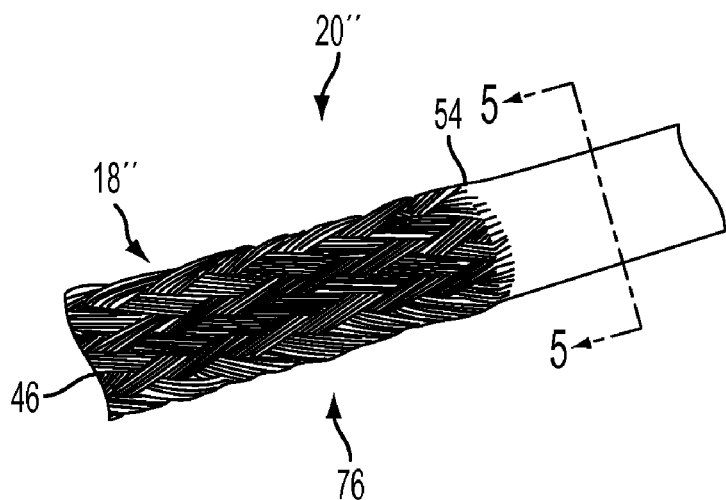
FIG. 4 is an enlarged perspective view of a third embodiment of the electrode assembly of the microbial fuel cell of FIG. 1.

With further reference to FIG. 3, the microbially active, unbound fibers at the unbound segment may optionally be enveloped with a suitable porous membrane 58 and in so doing prevent the long unbound fibers 46 of one anode assembly 20 from entangling with an adjoining anode assembly 20 thereby facilitating removal of any particular anode assembly 20 from the array 74 as may be required to perform service on the microbial fuel cell 10 and/or to replace defective or worn out anode assemblies 20. In another embodiment, the unbound fibers may form a mechanical structure 76 such as a 2 or 3 dimensional woven or knitted membrane (FIG. 4) and thereby provide for effective fluid to anode contact while preventing unwanted entanglements between anode assemblies 20.

The subject anode assembly 20 enables a straightforward and low cost process for manufacture. As a demonstration, a 1 meter length of an unsized 80,000 filament containing, carbon fiber tow (CFT) (supplied by MTLS, Inc., Alpharetta, Ga.) was impregnated with a dilute solution of 100 gms EP6NMW2.0R epoxy resin (provided by Zyvex Performance Materials, Columbus Ohio) in a 10 gm amount of a 50%/50% mixture of acetone and toluene by volume. The EP6NMW2.0 composition is a mixture of EPON epoxy and carbon nanotube (CNT) filler having a characteristic low d.c. volume resistivity (circa. 10-4 ohm-cm) when cured into a solid composite. A 0.5 gm quantity of Lindax crosslinking catalyst was added to the CNT-filled epoxy/solvent system. About ½ cc of the final solution was used to impregnate a length of about 100 cm of the CFT which was folded in half at the centerpoint along its length thereby creating a fiber mass along the length of 160,000 filaments. The remaining length of CFT was left in its original state and serves as the chemically active unbound segment of the anode.

A short length (less than 10 inches) of fine copper wire was inserted at the fold in the solution wetted tow and doubled over to form a configuration that resembles a thread that has been passed through the eye of a sewing needle. The length of doubled CFT was threaded onto the doubled over wire and passed through the inner diameter of a 6.0 mm OD round pultruded tube consisting of carbon fiber filled, cross linked modified acrylic (MODAR 865) binder resin supplied by Ashland Chemical. The wire "needle" was used to pull and pack the wetted portion of the CFT through the surrounding tube and slightly beyond. Once the wire pulling on the CFT extended a distance of about 3 mm above the topmost edge of the tube, the wire could be slid out of the loop in the CFT and removed. Optionally the wire may be left in place contacting the loop in the CFT and cured to provide a metal wire to CFT electrical connection. This procedure leaves a short length of about 3 mm of CFT projecting from one end of the encasing tube and a length of about ½ meter of free (un-wetted) fiber projecting out of the opposite end of the tube. The assembly was left overnight to permit the mixed solvent to evaporate and then the assembly was placed into a circulating air oven at 150° C. to enable the epoxy to cure. After cooling, the epoxy/tube bound segment of CFT was securely held within the length of tube. A test of electrical conductivity showed that a suitable low resistance contact between fibers and tube was achieved.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A microbial fuel cell comprising:
a cell housing defining first and second chambers, the first chamber being adapted for containing a fluid including a biomass, the second chamber being adapted for containing an oxygenated fluid;
a cathode extending into the cell housing second chamber; and
at least one electrode assembly extending into the cell housing first chamber, each electrode assembly having a plurality of substantially aligned electrically conductive fibers, each of the fibers extending from a first end to a second end and having an outer surface, the electrode assembly including
an anode segment extending from the first end of the fibers to an intermediate region disposed between the first and second ends of the fibers, at least a portion of the outer surfaces of the fibers of the anode segment being adapted for receiving a biofilm, and
a bound segment extending from the second end of the fibers to the intermediate region, the outer surfaces of the fibers of the bound segment being impregnated or encased with a binder, an electrically conductive tubular member enveloping the fibers of the bound segment.

2. The microbial fuel cell of claim 1 wherein the fibers are carbon fibers or carbon nanotubular filaments.

3. The microbial fuel cell of claim 1 wherein the electrode assembly includes a porous membrane enclosing the anode segment.

4. The microbial fuel cell of claim 1 wherein the anode segment is a mechanical structure.

5. The microbial fuel cell of claim 4 wherein the anode segment is a 2 or 3 dimensional woven or knitted structure.

6. The microbial fuel cell of claim 1 wherein the binder is thermosetting polymer.

7. The microbial fuel cell of claim 1 wherein the binder is thermosetting pre-polymers based on diglycidyl ether of bisphenol F.

8. The microbial fuel cell of claim 1 wherein the bound segment also includes a conductive adhesive disposed intermediate the fibers and an inner surface of the tubular member.

9. The microbial fuel cell of claim 8 wherein the adhesive is carbon nanotube or carbon particle filled polymer.

10. The microbial fuel cell of claim 1 further comprising a seal device disposed intermediate the bound segment and the cell housing, the bound segment, seal device and cell housing defining a liquid-tight boundary.

11. The microbial fuel cell of claim 1 wherein the tubular member includes a structure adapted to provide an electrical interconnection with a conventional external circuit.

12. The microbial fuel cell of claim 11 wherein the structure is selected from a threaded post, a threaded hole, a stake-on, and a metalized spade.

13. The microbial fuel cell of claim 1 wherein the anode segment and the bound segment each have a length, the length of the anode segment being at least 10 times the length of the bound segment.

14. A microbial fuel cell comprising:
a cell housing defining first and second chambers, the first chamber being adapted for containing a fluid including a biomass, the second chamber being adapted for containing an oxygenated fluid;
a cathode extending into the cell housing second chamber; and
at least one electrode assembly extending into the cell housing first chamber, each electrode assembly having a plurality of substantially aligned electrically conductive fibers, each of the fibers extending from a first end to a second end and having an outer surface, the electrode assembly including
an anode segment extending from the first end of the fibers to an intermediate region disposed between the first and second ends of the fibers, at least a portion of the outer surfaces of the fibers of the anode segment being adapted for receiving a biofilm, and
a bound segment extending from the second end of the fibers to the intermediate region, the outer surfaces of the fibers of the bound segment being impregnated or encased with a binder, an electrically conductive tubular member enveloping the fibers of the bound segment, a conductive adhesive being disposed intermediate the fibers and the tubular member;
wherein the bound segment and cell housing define a liquid-tight boundary.

15. The microbial fuel cell of claim 14 wherein the electrode assembly includes a porous membrane enclosing the anode segment.

\* \* \* \* \*